(12) United States Patent
Tran Le et al.

(10) Patent No.: US 10,187,913 B2
(45) Date of Patent: Jan. 22, 2019

(54) SYSTEMS AND METHODS FOR ENABLING HOTSPOT FUNCTIONALITYAH (71) Applicant: VODAFONE IP LICENSING LIMITED, Newbury, Berkshire (GB)

(72) Inventors: Mai Tran Le, Newbury (GB); Alan Law, Newbury (GB); Santiago Tenorio, Madrid (ES); Ricardo Batista, Newbury (GB); Naomi Lopez, Newbury (GB); Walter Bindrim, Düsseldorf (DE)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 176 days.

(21) Appl. No.: 15/003,459

(22) Filed: Jan. 21, 2016

(65) Prior Publication Data

US 2016/0212774 A1    Jul. 21, 2016

(30) Foreign Application Priority Data

Jan. 21, 2015   (GB) .................................. 1501029.1

(51) Int. Cl.
*H04L 12/801* (2013.01)
*H04L 12/24* (2006.01)
(Continued)

(52) U.S. Cl.
CPC ............. *H04W 76/10* (2018.02); *H04W 4/80* (2018.02); *H04W 24/02* (2013.01); *H04W 52/0206* (2013.01); *H04W 48/20* (2013.01); *H04W 76/14* (2018.02); *H04W 84/12* (2013.01); *H04W 88/04* (2013.01); *H04W 88/182* (2013.01); *Y02D 70/00* (2018.01); *Y02D 70/1222* (2018.01); *Y02D 70/142* (2018.01); *Y02D 70/164* (2018.01)

(58) Field of Classification Search
CPC ... H04W 88/04; H04W 88/182; H04W 76/10; H04W 24/02
See application file for complete search history.

(56) References Cited

U.S. PATENT DOCUMENTS

2006/0087993 A1   4/2006   Sengupta et al.
2010/0246486 A1   9/2010   Lin et al.
(Continued)

FOREIGN PATENT DOCUMENTS

EP    2 503 826 A1    9/2012
JP    2012227610 A    11/2012
(Continued)

OTHER PUBLICATIONS

IPO Search Report for GB1501029.1 dated Jun. 23, 2015.
(Continued)

*Primary Examiner* — Brian S Roberts
*Assistant Examiner* — Abusayeed M Haque
(74) *Attorney, Agent, or Firm* — Workman Nydegger (57) ABSTRACT

Systems and methods for controlling the activation of a hotspot function of a User Equipment (UE) device. Methods are provided for assessing the suitability of a UE to act as a hotspot dependent on parameters such as quality of data connection, battery life, and use of the UE by the user. Where multiple UEs are in proximity to each other a comparison of the suitability of each UE may be made and only the most suitable devices activated.

12 Claims, 4 Drawing Sheets

(51) Int. Cl.
*H04W 84/18* (2009.01)
*H04J 3/17* (2006.01)
*H04W 76/10* (2018.01)
*H04W 4/80* (2018.01)
*H04W 52/02* (2009.01)
*H04W 24/02* (2009.01)
*H04W 76/14* (2018.01)
*H04W 48/20* (2009.01)
*H04W 88/04* (2009.01)
*H04W 88/18* (2009.01)
*H04W 84/12* (2009.01)

(56) References Cited

U.S. PATENT DOCUMENTS

| | | | |
|---|---|---|---|
| 2012/0054353 A1 | 3/2012 | Jung et al. | |
| 2012/0113952 A1* | 5/2012 | Kneckt | H04W 72/0406 370/330 |
| 2012/0240197 A1* | 9/2012 | Tran | H04L 63/1416 726/4 |
| 2012/0246294 A1* | 9/2012 | Eaton | H04W 48/20 709/224 |
| 2014/0235244 A1 | 8/2014 | Hinman | |
| 2015/0139074 A1* | 5/2015 | Bane | H04W 48/08 370/328 |
| 2015/0141083 A1* | 5/2015 | Montevirgen | H04M 1/0208 455/575.1 |
| 2015/0201444 A1* | 7/2015 | Kiukkonen | H04W 72/0406 455/450 |
| 2015/0365833 A1* | 12/2015 | Stafford | H04W 24/02 370/252 |
| 2016/0192344 A1* | 6/2016 | Tiger | H04W 72/048 455/450 |
| 2016/0337936 A1* | 11/2016 | Li | H04W 40/04 |

FOREIGN PATENT DOCUMENTS

| | | |
|---|---|---|
| KR | 1020140100788 A | 8/2014 |
| WO | 2014/132549 A1 | 9/2014 |

OTHER PUBLICATIONS

European Search Report for EP 16 15 2300 dated Jun. 15, 2016.
Examination Report issued in European Application No. 16152300.6 dated Aug. 21, 2018.

* cited by examiner

SYSTEMS AND METHODS FOR ENABLING HOTSPOT FUNCTIONALITYAH

CROSS REFERENCE TO RELATED APPLICATIONS

This application claims priority to United Kingdom Application Number 1501029.1, filed on Jan. 21, 2015, the entirety of which is incorporated herein by reference in its entirety.

TECHNICAL FIELD

Embodiments of the present invention relate to systems and methods for enabling Wi-Fi hotspot functionality.

BACKGROUND

Many mobile device users opt to access the Internet via Wi-Fi hotspots, especially such Wi-Fi hotspots in public premises, e.g. restaurants, coffee shops, airports, etc, due to the advantage of not consuming the limited monthly data allowance available to the users via a cellular connection. Having a large number of users demanding free access these public Wi-Fi hotspots can be overloaded leading to slower access speed and unsatisfactory customer experience. In addition, public Wi-Fi hotspots may not be secure because they are usually open to every user.

Currently, there is an existing functionality (commonly known as tethering) on some User Equipment (UE) devices, which allows the UE to act as a Wi-Fi hotspot to provide internet access via the UE's cellular connection. Typically only people provided with connection details by the UE's owner can connect to the UE (or "tether" a device to the UE). Users normally have to manually enable and disable the hotspot option and also will need to manage distribution of connection details if multiple users are to be allowed to connect.

Systems are also available to enable internet access customers to provide a Wi-Fi hotspot using their home Wi-Fi router, but such hotspots are in fixed, not necessarily convenient, locations.

It is an aim of the present invention to provide improved techniques for managing and controlling Wi-Fi capabilities in Wi-Fi-enabled UEs. The embodiments described below are not limited to implementations which solve any or all of the disadvantages of known systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for controlling the activation of a hotspot function at a User Equipment (UE), comprising obtaining a first primary score indicating the suitability of using a first UE as a hotspot; and assessing the first primary score to ascertain the suitability of using the first UE as a hotspot; and determining whether to activate the hotspot functionality of the first UE at least partially based on said assessment.

The step of determining whether to activate the hotspot functionality of the first UE may also be at least partially dependent on whether other UEs capable of providing hotspot services are in proximity to the first UE.

The absence of other UEs capable of providing hotspot functionality may be an indication that the hotspot functionality of the first UE should be activated.

The method may further comprise the step of obtaining a second primary score indicating the suitability of using a second UE as a hotspot, wherein the second UE is in proximity to the first UE.

The step of assessing the first primary score may comprise assessing the first primary score relative to the second primary score.

The hotspot functionality of at least the first or second UE maybe active, and the step of determining may comprise an assessment of the number of connections to the active UE, wherein the suitability of a UE to act as a hotspot decreases as the number of connections increases.

The hotspot functionality of the first UE may be active, and the method may further comprise assessing the number of connections to the hotspot, and declining further connections if the number of connections is above a threshold.

The method may further comprise the step of the first or second UE connecting to a hotspot service provided by the other UE.

The primary score of a respective UE may be obtained based on at least one factor indicating at least one of movement of the respective UE; the respective UE is roaming outside its home network; the cellular radio network signal strength of the respective UE;

the remaining battery life of the respective UE; and cellular connection data usage of the respective UE by for its own purpose.

The primary score may be calculated at the respective UE or at a central computing system.

The method may further comprise the step of the central computing system instructing the first UE to activate its hotspot based on the determining step.

The assessment may be performed at a UE or at central computing system.

The instruction to activate may be sent via a mobile telephone network.

The primary score may be calculated as a sum of individual factors, each factor being relevant in the suitability of the relevant UE to act as a hotspot.

The method may further comprise the step of calculating a first secondary score, wherein the first secondary score is calculated based on the first primary score adjusted dependent on the number of connections to the first UE.

The method may further comprise the step of calculating a first secondary score, wherein the first secondary score is calculated based on the first primary score adjusted dependent on the number of connections to the first UE, and the step of calculating a second secondary score, wherein the second secondary score is calculated based on the second primary score adjusted dependent on the number of connections to the second UE.

The step of determining may further comprise the step of comparing the first primary score with the second secondary score, and activating the hotspot function if the first primary score is greater than the second secondary score.

The step of determining may further comprise the step of comparing the first primary score with the second secondary score, and if the first primary score is less than the second secondary score, established a connection from the first UE to the second UE such that the second UE acts as a host for the first UE.

The method may further comprise the step of assessing the first secondary score against the first primary score, and only accepting further connections if the first secondary score is above a threshold value compared to the first primary score.

There is also provided a method for controlling activation of hotspot functionality of a User Equipment (UE), the method comprising the steps of obtaining a plurality of primary scores corresponding to a plurality of UEs, each primary score representing the suitability of the respective UE to act as a hotspot; assessing the plurality of primary scores; and if the UE is not currently acting as a hotspot, activating the UE with the best primary score to act as a hotspot.

The method may further comprise the step of obtaining a plurality of secondary scores corresponding to a plurality of UEs, each secondary being equal to the primary score for the respective UE adjusted depending on the number of connections to the hotspot of the UE.

The method may further comprise the step of a UE declining further connections if the secondary score for that UE is below a threshold.

The method may further comprise the step of comparing the primary score of a UE whose hotspot function is currently not active with the secondary scores of UEs whose hotspot function is currently active, and if that primary score is better than the secondary scores activating the respective UE to act as a hotspot.

The method may further comprise the step of comparing the primary score of a UE whose hotspot function is currently not active with the secondary scores of UEs whose hotspot function is currently active, and if that primary score sore is worse than the secondary scores establishing a connection to a UE with a better primary score such that that other UE acts as a hotspot.

The primary scores may be obtained based on at least one factor indicating at least one of movement of the respective UE; the respective UE is roaming outside its home network; the cellular radio network signal strength of the respective UE; the remaining battery life of the respective UE; and cellular connection data usage of the respective UE by for its own purpose.

The primary scores may be obtained by the respective UE or by a remote system.

UEs may exchange primary scores and the step of assessing may be performed at each UE.

The UEs may transmit their respective primary scores to a remote system and the step of assessing may be performed at that remote system The method may further comprise the step of the remote system instructing a respective UE to activate a hotspot function.

The method may further comprise the step of the remote system instructing a respective UE to activate a hotspot function.

Three is also provided a method of controlling activation of a hotspot function of a User Equipment, comprising obtaining an assessment of whether a UE satisfies at least one condition, and determining whether to activate the hotspot functionality at the UE based at least partially on said assessment, wherein said at least one condition comprises at least one of the following: the first UE is not moving; the first UE is not roaming outside its home network; a cellular radio network signal strength at the location of the first UE is above a threshold level; a remaining battery life on the first UE is above a threshold battery life level; and a cellular connection data usage by the first UE for its own purpose is below a threshold level.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Embodiments of the present invention provide a method for enabling Wi-Fi hotspot functionality on a User Equipment (UE) if the UE satisfies at least one condition, such as the quality of network coverage at the UE, the length of battery life and whether the UE is actively using its own internet connection. The method will only enable the hotspot functionality on a UE if the UE has, for example, good network coverage, sufficient battery life and little self-use. A comparison to the attributes of other nearby UEs which may be able to provide a hotspot may also be made and the most appropriate UEs selected to have their hotspot functionality activated. The comparison and assessment may be made on an on-going basis to reflect changes in attributes of each UE. For example, as a UE accepts connections from other UEs its suitability for allowing further UEs to connect may decrease and it may be appropriate to prevent further Wi-Fi connections. This ensures a good experience for users connecting to the hotspot without degrading the UE owner's experience, and also makes efficient use of cellular networks.

In one embodiment, the degree to which the UE satisfies at least one condition is evaluated and may be assessed relative to those of other UEs in order to determine which UE is most suitable for use as a Wi-Fi hotspot. An indicator, such as a score, may be derived from an assessment of the at least one condition to indicate the suitability of the UE as a Wi-Fi hotspot. The indicator and the assessment of whether/how the UE satisfies the at least one condition may be recorded and broadcast to other UEs. The indicator may be assessed against indicators of other UEs to determine which UE is most suitable for use as a Wi-Fi hotspot host. The assessment of said at least one condition and/or the derivation of the indicator may be wholly or partially performed by the UE and/or any other device.

In addition to the indicators, other conditions may be taken into account when determining whether a UE should be used as a Wi-Fi hotspot host by another particular UE. For example, the number of connections already established with the UE may be taken into account. In one embodiment, even if a UE does not have the best indicator/score amongst local UEs, it may still be used as a Wi-Fi hotspot host if other conditions are satisfied, for example, if the UE with the best score does not have capacity to establish more Wi-Fi connections.

Figure 1:
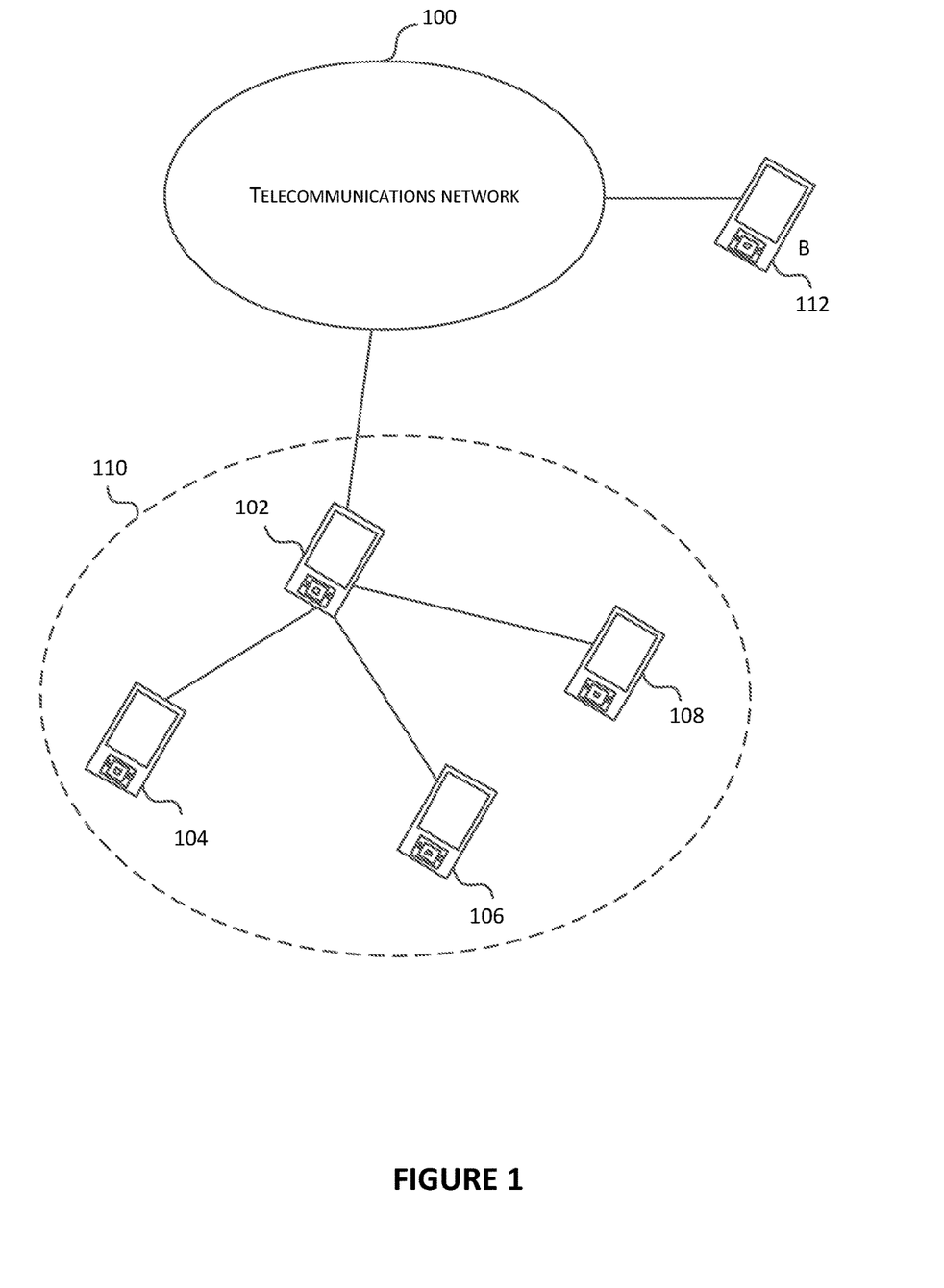
FIG. 1 is a schematic diagram of a telecommunications network comprising a plurality of UEs.

FIG. 1 is a schematic diagram of a telecommunications network 100 comprising a plurality of UEs 102, 104, 106, 108 and 112. The telecommunications network 100 may be a 3G and/or 4G and/or 5G cellular network. Each of these UEs can connect to the telecommunications network 100 via cellular radio signals. In one embodiment, each of the UEs are Wi-Fi enabled. In addition, each of them has Wi-Fi hotspot functionality, allowing them to act as Wi-Fi hotspots, providing Wi-Fi access to Wi-Fi-enabled UEs that are within range.

In this example UE 102 has its Wi-Fi hotspot function activated. UEs 104, 106 and 108 which are within range can tether to it, such that UEs 104, 106 and 108 can access the Internet via UE 102. In this case, UE 102 becomes a Wi-Fi hotspot host and UEs 104-108 are Wi-Fi clients. UE 112 is outside the Wi-Fi coverage of hotspot 102 and is not able to tether to hotspot 102. The methods described herein provide means to control activation of UE 102 as a Wi-Fi hotspot.

Figure 2:
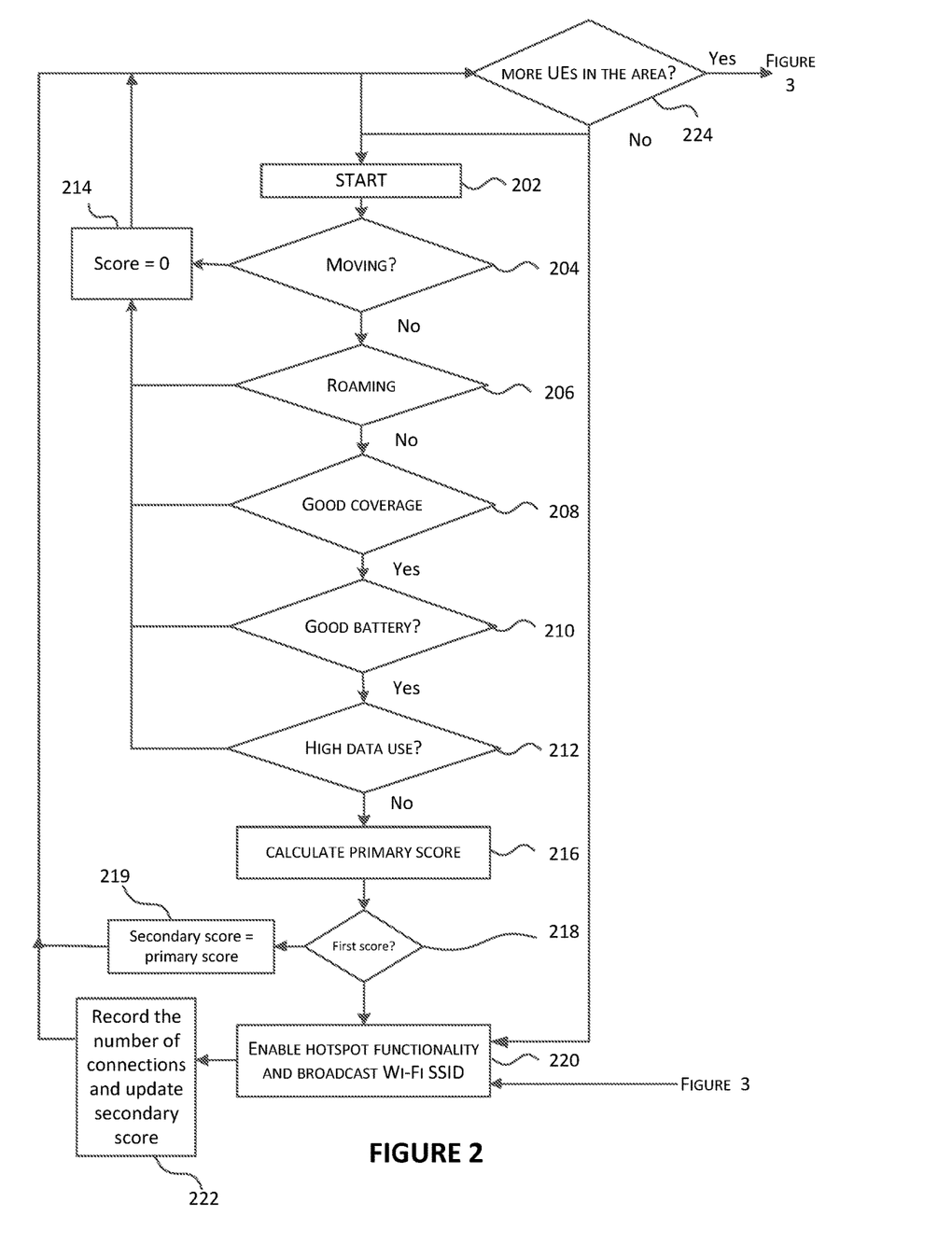
FIG. 2 is a flow diagram of a method for determining whether a UE is suitable for use as a Wi-Fi hotspot.

FIG. 2 is a flow diagram illustrating a method carried out in accordance with one embodiment of the present invention. The method comprises steps for determining whether to enable the hotspot functionality on a UE, e.g. the UE 102. The method is only operated if the UE's user has enabled it, and the Mobile Network Operator (MNO) supports the function. Specific software to implement the method may be required on the UE, or that functionality may be implemented in pre-installed software or firmware.

The process starts with step 202. The start 202 of the process may be periodically triggered by a timer, or triggered by a particular event in an ad-hoc manner.

A number of conditions are evaluated when determining whether to enable the hotspot functionality on a UE. The conditions may comprise whether the UE is moving (step 204), whether the UE is roaming outside its home network (step 206), whether there is good network coverage at the location of the UE (step 208), whether there is enough battery life on the UE (step 210) and whether the UE is actively using the cellular data connection for itself (step 212).

In step 204, movement of the UE may be detected by using the Global Positioning System (GPS). The UE may detect whether the GPS system of the UE is currently activated. If the system is not activated the method may ask the user whether they wish to turn the GPS on, in which case the GPS is activated and used in the method. If the user declines alternative positioning systems may be utilised. As well known in the art, the GPS system along with a GPS application installed on the UE may detect a change of location of the UE. Other movement detection or positioning techniques known in the art such as location area updates in the mobile network can also be used either alone, in combination with the GPS system or in any combined way to determine the movement of the UE. In one embodiment, a movement is not determined unless the displacement of the user equipment is above a certain threshold. That threshold may be determined by the MNO of the network to which the UE is connected, may be dependent on the frequency of the connection, cell to which the UE is connected, or may be calculated dynamically based on any appropriate factors. The threshold may be applied to the speed of the UE, or total movement over a period of time. Step 204 begins the creation of a primary score, which primary score indicates the suitability for use as a hotspot. If the UE is moving above the threshold then a score of zero is applied at step 214, and the method returns to either step 202 or step 224, and the UE is not activated as a hotspot. If movement is less than the threshold a score is calculated dependent on the movement detected. The primary score indicates the suitability of the UE to act as a hotspot (based on the movement alone at this stage) and so the score may be set higher the less movement is detected.

In step 206, it is determined whether the UE is roaming in a non-home mobile network. Activating hotspot functionality while roaming may be undesirable due to the higher costs of providing data connectivity when away from a home mobile network, but use as a hotspot may still be appropriate in some circumstances, for example if there is an agreement with the home network operator. As in step 202, if this test is failed (for example the UE is roaming in a network without an agreement) a score of zero is applied and the method exits. Otherwise the primary score is updated by a value dependent on this test. For example, if the UE is in the home network a maximum score may be applied, or if the UE is roaming in a network with an agreement a lower score may be applied.

In step 208, the process determines whether the UE has good network coverage. This can be determined if the strength of signals received and/or transmitted by the user equipment is above a threshold level, or based on an assessment of the data connections available to the UE through the core network. For UE connected to the 4G network, the information indicating the quality of network coverage can be extracted from the UE itself. In an example a score of zero (and exit of the method) may be applied if the UE is not connected to a 4G network. If the UE is connected to a 4G network the primary score is updated dependent on the quality of the connection available.

In step 210, good battery life can be determined if the remaining battery life of the UE is above a pre-determined level. As described previously, a score of zero may be applied if the battery life is poor, or a value is applied to the primary score dependent on the amount of battery life remaining.

In step 212, active use of the data connection may be determined if the amount of data sent from and/or received by the UE is above a pre-determined level. Active use of the data connection by the UE itself may negatively impact the Wi-Fi service quality should the UE be used as a Wi-Fi hotspot due to the capacity restrictions of the cellular connection. If the data use is above a threshold a score of zero may be applied to the primary score and the method exits, otherwise the primary score is updated dependent on the amount of data use by the UE (a higher score indicates less use by the UE and hence more capacity available for hotspot use.

In this example, if it is determined that the UE is moving, roaming, does not have good network coverage, does not have good battery life or the data connection is being actively used for the user equipment's own purpose, the process will determine that the UE is not suitable for use as a Wi-Fi hotspot. Suitability for use as a hotspot may be indicated by a binary flag, or by a quantitative suitability score. Preferably the hotspot functionality on the UE is deactivated when it is determined that the UE is not suitable for use as a hotspot.

The method reaches step 216 if none of the tests have given a zero value. A total primary score may be calculated based on the primary score calculated in steps 204-212 and any other desired parameters. The primary score indicates the suitability of the UE to be used as a Wi-Fi hotspot (step 216). In the example described, the total score is an aggregate value of scores indicating movement, quality of network coverage, length of battery life and activity of data connection by the UE itself. Various algorithms may be utilised depending on the conditions that are deemed to be important in varying situations. For example, failing one test, such as the roaming test, may force a score of zero regardless of the other results or a single zero score may allow the method to continue. More than one score may be utilised, for example a score for each test, and each score may be weighted depending on the relative importance of each test. In other embodiments the total score may be replaced by any non-numerical indicator or metric that can be used to indicate the extent to which the UE is suitable for use as a Wi-Fi hotspot.

At step 218 it is checked whether this is the first primary score calculated in a predefined period of time. If it is the first time, a secondary score is set to the value of the primary score (step 219) and the method returns to 202 or 224. This check ensures the UE is in a steady state rather than, for example, briefly passing through a suitable location. This ensures only UEs that are likely to remain available for a reasonable period of time are activated as hotspots. If this is not the first score, the hotspot function is activated at step 220 and an appropriate SSID is broadcast. The UE may then provide hotspot functionality to devices connecting to the UE.

At step 222, while hotspot functionality is activated, the number of active connections to the hotspot are monitored, and a secondary score calculated. The secondary score is equal to the primary score reduced by an amount for the number of connections to the hotspot. This secondary score may be utilised in determining whether to activate further hotspots in the local area and whether to allow devices to connect to the hotspot. Other calculation methods may be utilised for the secondary score which lead to the secondary score being an indication of the suitability of the UE to act as a hotspot, taking into consideration the use being made of the hotspot by other UEs. As more UEs connect to a hotspot it may become less suitable as the cellular connection is shared between each UE, thus reduced the data capacity available to each UE.

At step 224 it is checked whether there are other UEs implementing the method in proximity to the UE. UEs may be determined to be in proximity to each other if they are capable of providing hotspot services to at least partly overlapping areas. This check may be done by peer-to-peer communication, or via a core network connection. If there are no other UE the UE proceeds to step 202 and conducts the method described hereinbefore to take a second score, or the UE may proceed to step 220 and activate the hotspot function. Otherwise the method may proceed to step 302.

Figure 3:
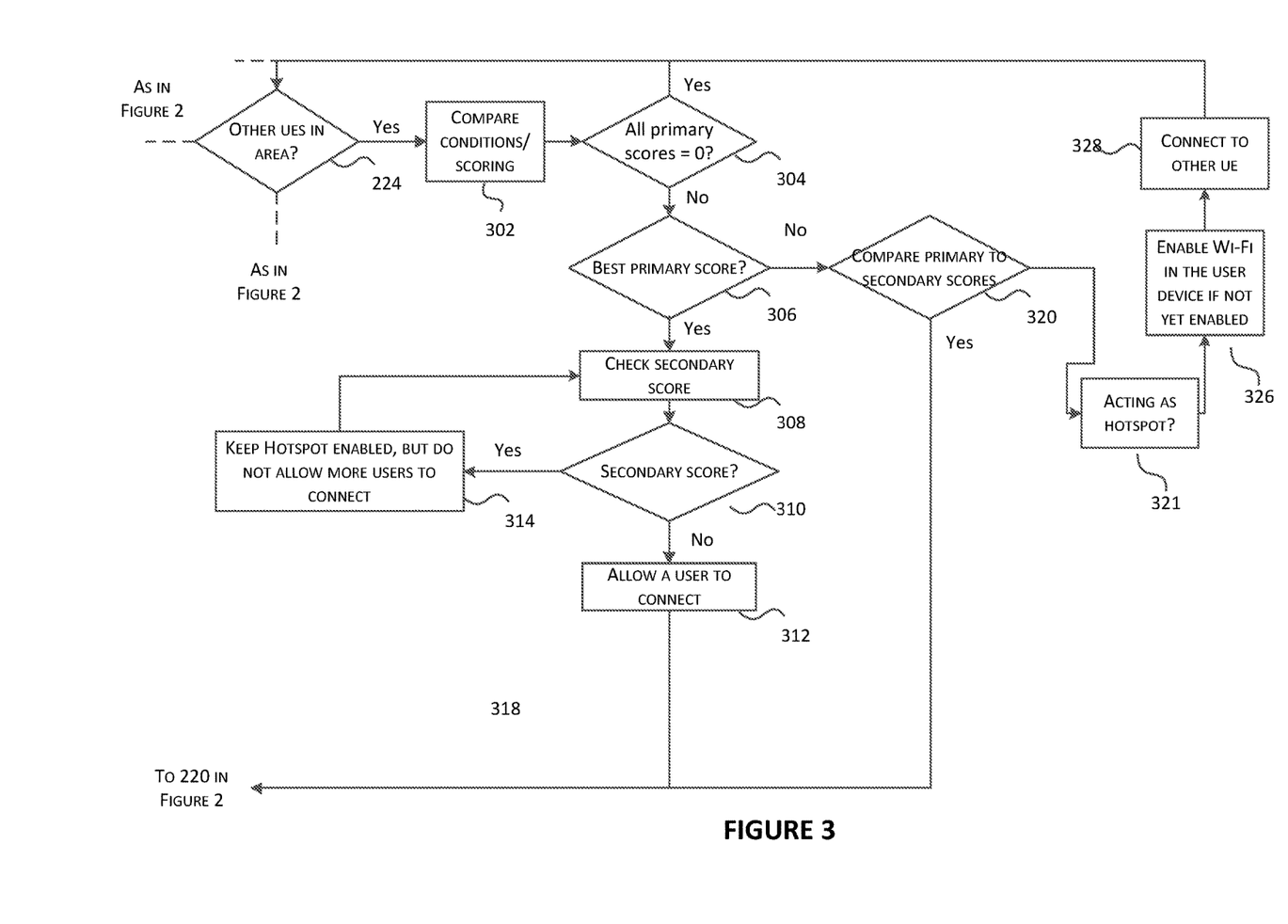
FIG. 3 is a flow diagram of a method for determining which UE among a plurality of UEs should be chosen for use as a Wi-Fi hotspot.

At step 302 UEs in proximity to each other exchange primary and secondary scores. Those scores may be exchanged via peer-to-peer Wi-Fi connections, or via a core network connection. Furthermore the scores may be transmitted to a central system, for example in the mobile network systems, and the scores compared in that system. At step 304 the primary scores are compared and if all primary scores are zero the method returns to step 224 and 202.

At step 306, all UEs with a score which is not zero compare their own primary scores with those of the other UEs (step 306). If the comparison shows that a UE 102 has the best primary score in its Wi-Fi coverage area, the process will proceed to step 308 to check the UE's secondary score, which is an indication of how many connections there are to the particular hotspot. If at step 310 the secondary score is greater than half the primary score (or any number that indicates the hotspot can accept further connections) the UE proceeds to step 312 and allows further UEs to connect. However, if the secondary score is less than or equal to half the primary score (indicating a number of connections have been made to the hotspot), at step 314 the hotspot is left enabled but no further UEs are permitted to connect. The method then returns to step 308 and circulates in the loop to monitor the number of connections and manage whether further UEs are permitted to connect.

If at step 306 if the UE did not have the best primary score, the method proceeds to step 320 and the UE's primary score is compared to other secondary scores in the area. If the UE's primary score compares favourably to the secondary score of the UE with the best primary score it indicates that the "best" UE's performance may have been degraded by having too many connections and that the UE should now be activated as a hotspot. In that case the method proceeds to step 220 and the UE's hotspot function is activated.

If at step 320 the primary score is worse than the "best" UE's secondary score the UE may desire to connect by Wi-Fi to an active hotspot in the area, as this comparison suggests the other UE has a better data service than the UE itself. At step 321 the UE checks whether its hotspot functionality is currently activated (for example the UE may previously have had good reception, but then moved and its cellular connection degraded). If the function is activated it is disabled at step 321, otherwise the method moves directly to step 326. At step 326 the UE activates its Wi-Fi, and at step 328 connects to an identified hotspot as a client. The method returns to steps 224 and 202 to monitor the UEs suitability to act as a hotspot. If at step 326 it is detected that the UE is acting as a hotspot, the hotspot function is disabled.

In summary, the method at steps 320, 326, 328 allows a UE which is not the "best" UE to support another UE which has become degraded due to accepted too many connections, or to use another UE's hotspot function to improve its data connection.

The methods according to the embodiments of the present invention may be performed by a software application installed on a UE. In this case, to be a Wi-Fi host or a client the software application will need to be installed in the UE. A plurality of UEs each having the software application installed may communicate with one another to exchange their respective suitability scores and select the most suitable UE to act as a Wi-Fi hotspot at all time. Some of the UEs may become Wi-Fi hotspot hosts, while others may become Wi-Fi clients.

The above methods may also be performed at least partially by a server communicating with a plurality of UEs, each with the software application installed. For example, the server may transmit queries to the UEs, analyse the responses, and transmit instructions to each UE, or only some steps of the process may be performed by the server.

In the embodiments of the present invention, authentication between Wi-Fi hosts and clients via EAP-SIM/AKA authentication is preferable as they help avoid the need for the Wi-Fi clients to provide a password. They are secure and seamless Wi-Fi connections for customers using the Subscriber Identity Module (SIM)—RFC 4186 or Authentication and Key Agreement (AKA)—RFC 4187.

Alternatively or additionally, a Wi-Fi client can be authenticated via a captive portal or a specific application program using certificates.

In the case of using a captive portal for SIM-less devices or in any other appropriate cases, the software application implementing embodiments of the present invention may comprise an algorithm for providing a one-time password and user name to Wi-Fi users.

To encourage users of the software application implementing the embodiments of the present invention to turn on temporary Wi-Fi hotspots on their UEs, the users may be rewarded for becoming W-Fi-hotspot hosts and any factors negatively affecting the users' inclination to become hosts, such as an increased battery drain caused by the hotspot functionality, will be minimised.

To differentiate the data flow caused by self-data communications (i.e. the data flow used by the UE itself) in a hotspot host from the data flow through the hotspot used by the Wi-Fi clients, a specific Access Point Name (APN) may be used to establish the data connection used for the hotspot service.

Sections of the methods shown in FIGS. 2 and 3 may be implemented independently of one another. For example, the sections relating to calculating a primary score and activating hotspot functionality may be implemented as an independent method without calculating a secondary score and without any comparison of scores between UEs. Similarly the method of comparing suitability between UEs may be performed without a continuous calculation of scores. Furthermore, the methods for determining whether to allow further UEs to connect to a hotspot may be implemented without other aspects of the method. These sections of the method are provided by way of example only and other sections may also be utilised. The disclosure of this application is not restricted by the specific combination of steps shown in the figures, and described herein, but includes any appropriate subsets or combinations of steps performed in any appropriate order. Sections of the method may be performed in parallel. For example, the UE may continue to calculate its primary score while operating as a hotspot, and may continuously update its secondary score.

The methods and system described herein enabled UEs to automatically configured and set up a network of peer-to-peer connections to provide access to a telecommunications network. The methods and systems thus enable the creation of a self-organising network utilising devices configured to implement the methods and systems described herein.

Figure 4:
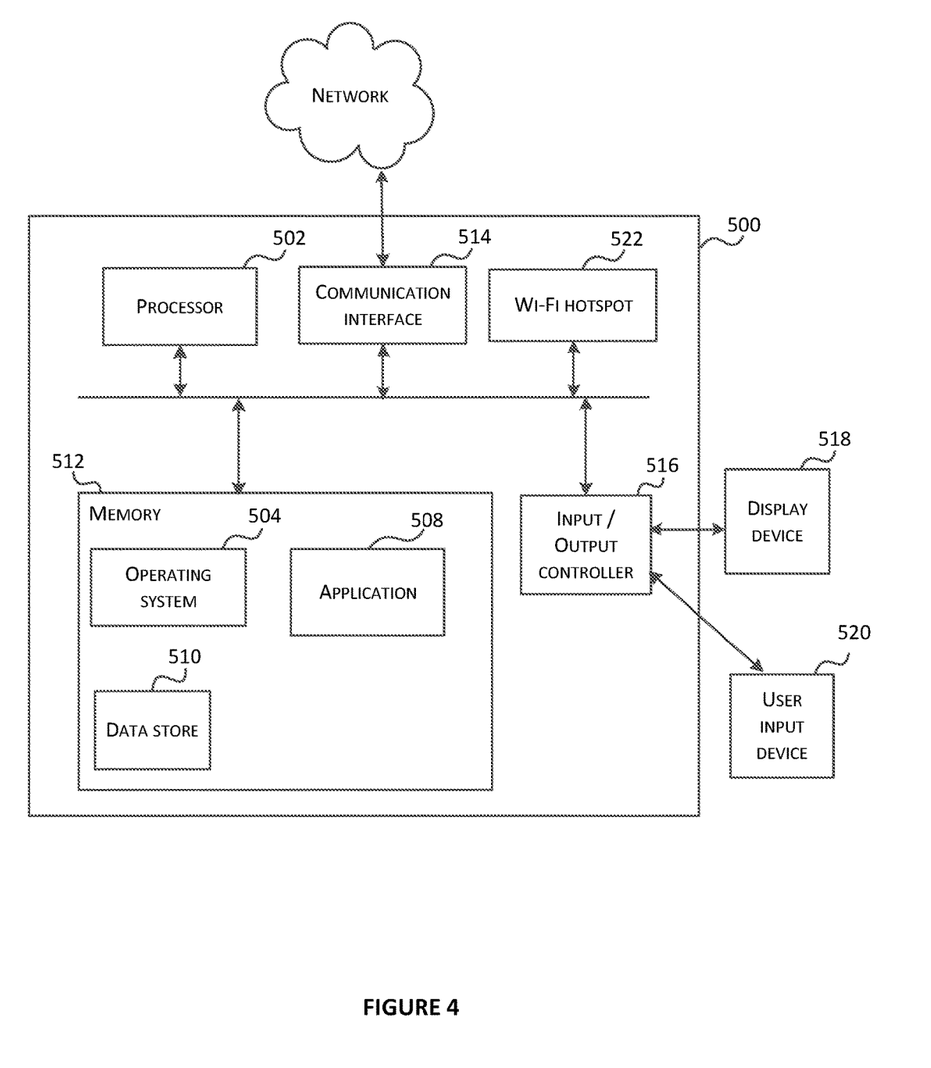
FIG. 4 is a schematic diagram of a computing device on which a software program implementing the methods of the present invention is configured to run.

FIG. 4 illustrates various components of an exemplary computing-based UE 500 which may be implemented as any form of a computing and/or electronic device, and in which embodiments of the processes of FIGS. 2-3 may be implemented.

Computing-based UE 500 may comprises one or more processors 502 which may be microprocessors, controllers or any other suitable type of processors for processing computer executable instructions to control the operation of the UE in order to receive data from a telecommunications network. In some examples, for example where a system on a chip architecture is used, the processors 502 may include one or more fixed function blocks (also referred to as accelerators) which implement a part of any of the methods of FIGS. 2-4 in hardware (rather than software or firmware). Platform software comprising an operating system 504 or any other suitable platform software may be provided at the computing-based UE to enable application software to be executed on the UE.

Software application 508 implementing (fully or partially) any of the methods of FIGS. 2-4 may be provided at the computing-based UE 500. Data store 510 may hold telecommunications network parameters, network performance data, service quality indicators or other data that is required for or produced during the methods according to embodiments of the present invention.

The computer executable instructions may be provided using any computer-readable media that is accessible by computing based device 500. Computer-readable media may include, for example, computer storage media such as memory 512 and communications media. Computer storage media, such as memory 512, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. Although the computer storage media (memory 512) is shown within the computing-based device 500 it will be appreciated that the storage may be distributed or located remotely and accessed via a network or other communication link (e.g. using communication interface 514).

The computing-based device 500 also comprises an input/output controller 516 arranged to output display information to a display device 518 which may be separate from or integral to the computing-based device 500. The display information may provide a graphical user interface. The input/output controller 516 is also arranged to receive and process input from one or more devices, such as a user input device 520 (e.g. a mouse or a keyboard). This user input may be used to set thresholds or criteria, configure optimization algorithms, view optimization results. In an embodiment the display device 518 may also act as the user input device 520 if it is a touch sensitive display device. The input/output controller 516 may also output data to devices other than the display device, e.g. a locally connected printing device.

Wi-Fi hotspot system 522 provides a Wi-Fi functionality which enables remote devices to connect the UE 500 via the Wi-Fi standard and utilize the cellular connection of the UE for internet access.

Reference is made throughout this disclosure to a Wi-Fi hotspot but the disclosure is equally applicable to any hotspot operating according to any other communications protocol. Furthermore, references herein have been to the UE being connected via a cellular connection, but any other form of connection may also be utilised.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A method for controlling activation of hotspot functionality of a User Equipment (UE), the method comprising:
   obtaining a plurality of primary scores corresponding to a plurality of UEs, each primary score representing the suitability of the respective UE to act as a hotspot;
   assessing the plurality of primary scores; and
   if the UE is not currently acting as a hotspot, activating the UE with the best primary score to act as a hotspot.

2. The method of claim 1, further comprising:
   obtaining a plurality of secondary scores corresponding to a plurality of UEs, each secondary being equal to the primary score for the respective UE adjusted depending on the number of connections to the hotspot of the UE.

3. The method of claim 2, further comprising the step of a UE declining further connections if the secondary score for that UE is below a threshold.

4. The method of claim 2, further comprising the step of comparing the primary score of a UE whose hotspot function is currently not active with the secondary scores of UEs whose hotspot function is currently active, and if that primary score is better than the secondary scores activating the respective UE to act as a hotspot.

5. The method of claim 2, further comprising the step of comparing the primary score of a UE whose hotspot function is currently not active with the secondary scores of UEs whose hotspot function is currently active, and if that primary score sore is worse than the secondary scores establishing a connection to a UE with a better primary score such that that other UE acts as a hotspot.

6. The method of claim 1, wherein the primary scores are obtained based on at least one factor indicating at least one of:
   movement of the respective UE;
   the respective UE is roaming outside its home network;
   the cellular radio network signal strength of the respective UE;
   the remaining battery life of the respective UE; and
   cellular connection data usage of the respective UE by for its own purpose.

7. The method of claim 1, wherein the primary scores are obtained by the respective UE.

8. The method of claim 7, wherein UEs exchange primary scores and the step of assessing is performed at each UE.

9. The method of claim 7, wherein the UEs transmit their respective primary scores to a remote system and the step of assessing is performed at that remote system.

10. The method of claim 9, further comprising the step of the remote system instructing a respective UE to activate a hotspot function.

11. The method of claim 1, wherein the primary scores are obtained by a remote system.

12. The method of claim 11, further comprising the step of the remote system instructing a respective UE to activate a hotspot function.

* * * * *